United States Patent [19]

Coombs et al.

[11] Patent Number: 5,634,436

[45] Date of Patent: Jun. 3, 1997

[54] EXERCISE AND AMUSEMENT DEVICE FOR ANIMALS

[76] Inventors: David M. Coombs, 930 Nancy St., Manassas Park, Va. 22111; Larry G. Wood, 5414 Colchester Meadow La., Fairfax, Va. 22030

[21] Appl. No.: 555,088

[22] Filed: Nov. 8, 1995

[51] Int. Cl.$^6$ .................................................. A01K 29/00
[52] U.S. Cl. ................................................ 119/707; 446/302
[58] Field of Search ...................................... 119/702, 707; 369/31, 63; 446/302, 303; 434/319

[56] References Cited

U.S. PATENT DOCUMENTS

| | | | |
|---|---|---|---|
| 1,923,428 | 5/1933 | Curran | 446/175 |
| 2,194,736 | 11/1940 | De Bruler | 119/708 |
| 2,698,598 | 1/1955 | Hadley | 119/708 |
| 3,383,114 | 5/1968 | Ryan | 434/319 X |
| 3,459,158 | 8/1969 | Mitchell, Jr. | 119/708 |
| 3,792,490 | 2/1974 | Wigal | 446/302 |
| 3,830,202 | 8/1974 | Garrison | 119/707 |
| 4,017,905 | 4/1977 | Convertine et al. | 360/96 |
| 4,669,007 | 5/1987 | Fujishige | 369/63 |
| 4,803,953 | 2/1989 | Graves | 119/707 |
| 4,878,871 | 11/1989 | Noto | 446/302 |
| 5,323,370 | 6/1994 | Davison et al. | 369/63 |
| 5,415,132 | 5/1995 | Meyer | 119/707 |
| 5,495,357 | 2/1996 | Osterhout | 359/152 |

*Primary Examiner*—Robert P. Swiatek
*Assistant Examiner*—Yvonne R. Abbott
*Attorney, Agent, or Firm*—Locke Reynolds

[57] ABSTRACT

An exercise and amusement device for animals for providing repeated audio stimulation to an animal in response to the animal taking hold and pulling upon a portion of the device. A housing containing a audio unit may be mounted to a base or a stationary support, with playback of a series of sounds stored within the audio unit initiated by an attached tension-activated switch attached to an external cable graspable by the animal. The audio unit is provided for storing a series of sounds in a memory, directing a series of sounds stored in the memory to an audio speaker whereby the series of sounds is played, deleting a series of sounds from the memory, receiving a new series of sounds from a microphone, and adding the new series of sounds to the memory.

18 Claims, 5 Drawing Sheets

EXERCISE AND AMUSEMENT DEVICE FOR ANIMALS

BACKGROUND OF THE INVENTION

1. Field of the Invention

The present invention generally relates to devices capable of use by animals, and more particularly relates to devices for the amusement and exercise of animals that do not require human presence, intervention or action in order for animals to be amused and exercised for an extended period of time.

2. Description of the Prior Art

There are presently available a number of devices directed to amusement or exercise of animals that may be used without necessitating continued human intervention and attention. The array of such devices includes devices having a hollowed member mounted to an elastic member attachable to a stationary support, the hollowed member containing a plurality of small objects, similar to the contents of an infant's rattle, capable of producing sound when subjected to rapid movement, or containing substances capable of producing odors attractive to animals when the animal bites or pulls at a porous hollowed member, such as those described in U.S. Pat. Nos. 2,194,736 and 2,698,598. Further, such devices may also include a rigid rod disposed between a suspended elastic member and a hollowed member, to prevent entangling the animal, such as that described in U.S. Pat. No. 3,459,158. In addition, devices directed to a pull toy for animals may be capable of use without attachment to a stationary support, such as that described in U.S. Pat. No. 3,830,202.

Despite the availability of such devices, there exists a need in the art for an exercise and amusement device for animals that is capable of producing a set of sounds recognizable by individual animals as similar to sounds ordinarily associated with the voice or other sounds made by the animal's owner or caregiver, the set of sounds produced in response to pulling or tugging at the device by the animal, yet capable of producing different sets of sounds as from time to time deemed appropriate by the animal's owner or caregiver, and capable of attachment to a variety of stationary supports.

SUMMARY OF THE INVENTION

In order to aid in the understanding of the present invention, it can be stated in essentially summary form that it is directed to an exercise and amusement device for animals that is capable of producing a set of sounds recognizable by individual animals as similar to sounds ordinarily associated with the voice or other sounds made by the animal's owner or caregiver, the set of sounds produced in response to activation by force exerted by animal, and further, is capable of deleting a set of stored sounds and thereafter storing a new set of sounds as from time to time deemed appropriate by the animal's owner or caregiver, and which may be attached to and used with a variety of stationary supports.

More specifically, the present invention is directed to an exercise and amusement device for animals including a generally cylindrical tapered housing having a larger first end and a smaller second end. A cap is mounted to the housing at the first end using a plurality of threaded cap fasteners, each cap fastener disposed through a countersunk cap bore defined in the cap and threadably engaged with one of a plurality of tapped cap fastener holes defined in the housing. The cap defines a plurality of sound transmission holes, and also defines an on/off switch bore, a volume control opening, a record switch hole, and a pair of support mounting bores. A cover is mounted to the housing at the second end using a plurality of threaded cover fasteners, each cover fastener disposed through one of a plurality of countersunk cover bores defined in the housing and threadably engaged within one of a plurality of tapped cover fastener holes defined in the cover. The cover also defines a tapped mounting bolt hole, and a mounting eye bolt, having a threadably engaged nut, is removably attached to the cover at the mounting bolt hole. The housing, the cap, and the cover may be formed of a durable, sturdy, resilient material, such as PVC plastic.

An audio unit, capable of storing and playing a series of sounds, is disposed within the housing, and includes a support mounted to the cap by threaded support fasteners each disposed through one of the support mounting bores and threadably engaged with a tapped support fastener hole defined in each of a pair of arms attached to the support. A generally cylindrical pad is disposed within the housing proximate to the second end and provides cushioned support for the audio unit with respect to the interior of the housing. The audio unit further includes an audio speaker mounted to and partially disposed through the support at a speaker slot defined by the support, a power supply, and a copper etched, printed circuit board. The power supply is mountable to the support at a first surface by snapping the power supply into a power supply bracket integrally formed with the support, and the circuit board is mounted to the support at an opposing second surface. Connected to the circuit board is a microprocessor sound recorder module having a nonvolatile memory capable of storing a series of sounds. The audio unit also includes a piezoelectric audio microphone connected to the sound recorder module. The volume of sound playback may be varied by a volume control mounted to the support, disposed through the volume control opening, and electrically connected to the circuit board. A record switch is mounted to the support at a record switch bracket attached to one of the arms and disposed partially through the record switch hole, and is electrically connected to the circuit board. A tension-activated on/off switch having a threaded neck is disposed within the housing proximate to the first end so that the neck projects through the on/off switch bore, and is mounted to the cap by a knurled switch nut and a switch washer. A cable is attached to the on/off switch whereby a pulling action exerted on the cable acts to activate the on/off switch. The on/off switch is electrically connected to the circuit board by on/off switch wires attached to a quick-release electrical connector. A flexible, resilient sheath is disposed surrounding the cable, and distal to the housing, the cable and the sheath are disposed to form a loop secured by a surrounding collar portion. Loosely disposed through the loop is a flexible, resilient looped graspable member, adapted to be grasped in the mouth of an animal. The graspable member may be selected to be any of a variety of lengths and may be replaced as needed due to wear and tear. In addition, a favorite toy of an animal may be removably attached to the present invention by tying to the graspable member, for grasping by the animal.

The housing may be mounted to a relatively heavy base, such as a water or sand filled outdoor umbrella stand, the base defining a base upper bore and a base lower bore, and having an interior shoulder disposed between the base upper bore and the base lower bore. The shoulder defines a shoulder hole connecting the base upper bore and the base lower bore. After removing the mounting eye bolt and the nut from the tapped mounting bolt hole, the housing may be inserted into the base upper bore and attached to the base by inserting the mounting eye bolt and the nut into the base lower bore, through the shoulder hole and threadably engaging the tapped mounting bolt hole, with the nut bearing against the shoulder.

In use, activation of the on/off switch by pulling on the cable causes power from the power supply to be delivered to the circuit board, whereby the sound recorder module is activated. The microprocessor sound recorder module includes means for storing a series of sounds in the memory, means for directing a series of sounds stored in the memory to the speaker whereby the series of sounds is played, and means for replacing the series of sounds stored in the memory with a new, second series of sounds, including means for deleting a series of sounds from the memory, means for receiving a new series of sounds from the microphone, and means for adding a new series of sounds received through the microphone to the memory.

In the event that a series of sounds has been stored in the memory of the sound recorder module, a pulling force exerted on the cable causes the on/off switch to activate the audio unit, whereby the series of stored sounds present in the memory is directed to an integrated circuit audio amplifier mounted to the circuit board and thereafter to the speaker, with the volume control adjusted to set the desired loudness of playback of the series of sounds. In this way, an animal pulling at the graspable member may cause a series of sounds to be played by the present invention. One series of sounds that may be present within the memory is that of the voice of a person familiar to the animal, so that playing of such series of sounds stimulates the animal to again pull at the graspable member.

In the event that a series of sounds is not stored in the memory of the sound recorder module, or in the event that it is desired to replace a series of sounds presently stored with the memory with a new series of sounds, a new, second series of sounds may be stored in memory by simultaneously activating the record switch and causing the desired new series of sounds to be announced near the sound transmission holes, whereby the microphone receives the series of sounds. The announced new series of sounds is directed to the sound recorder module, converted and stored in the memory, ready for playback in response to activation of the on/off switch.

In a second embodiment, the housing may be utilized without the base, by removable attachment to a stationary object such as a door, post, tree or similar, looping a connecting rope or similar through the mounting eye bolt and attaching the rope to the stationary object. In order to protect the housing when attached to a stationary object, a flexible, protective covering boot may be disposed around the housing.

It is an object of the present invention to provide an exercise and amusement device for animals that is capable of storing and playing a set of sounds upon being activated by force exerted by an animal.

It is another object of the present invention to provide an exercise and amusement device for animals that is capable of deleting a stored set of sounds and recording another set of sounds.

It is another object of the present invention to provide an exercise and amusement device for animals that is capable of playing a set of sounds at variable volume.

It is another object of the present invention to provide an exercise and amusement device for animals that is capable of attachment to a variety of supports.

It is another object of the present invention to provide an exercise and amusement device for animals that is compact, lightweight, inexpensive to produce, and of relatively simple construction with a minimum number of components, yet is of sturdy construction and may be easily disassembled and serviced.

Further objects and advantages of the present invention will be apparent from a study of the following portion of the specification, the claims, and the attached drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated by the inventors for carrying out the invention in a commercial environment, although it should be understood that various modifications can be accomplished within the parameters of the present invention.

Figure 1:
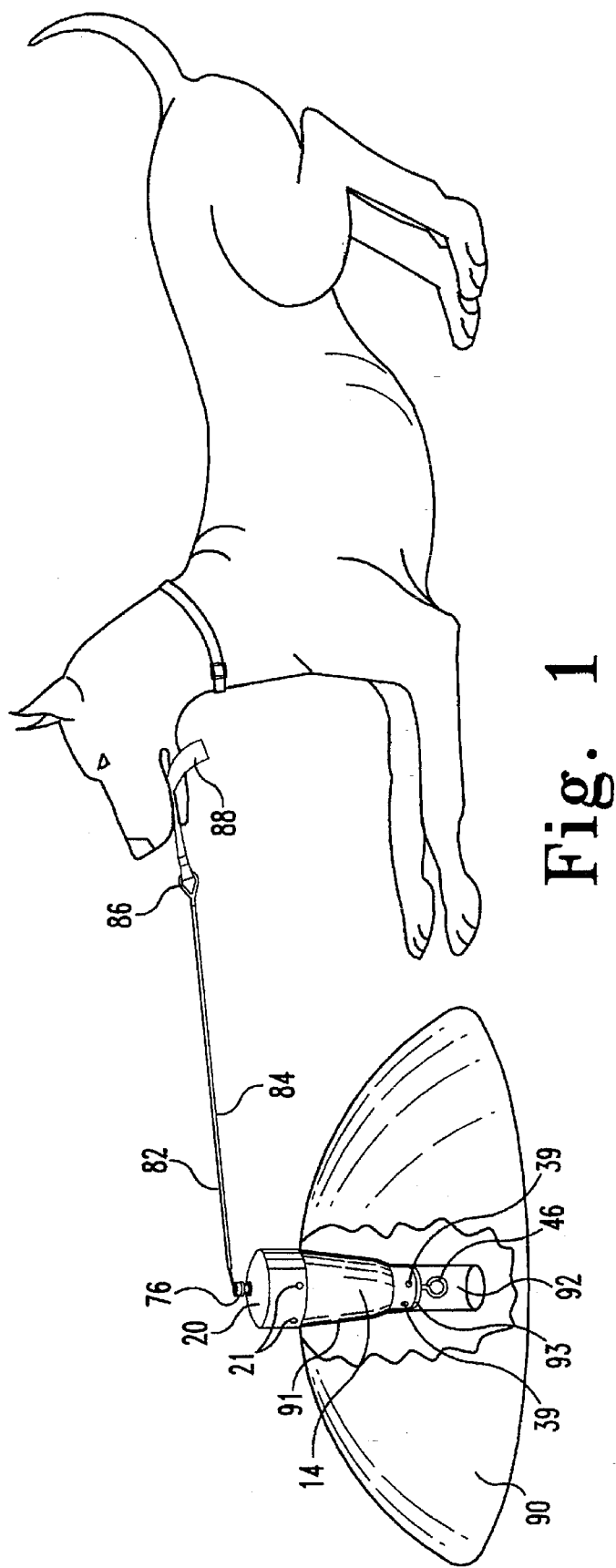
FIG. 1 is a partial cut-away perspective view of an exercise and amusement device for animals representing the present invention depicted with a dog pulling on the cable.
Figure 2:
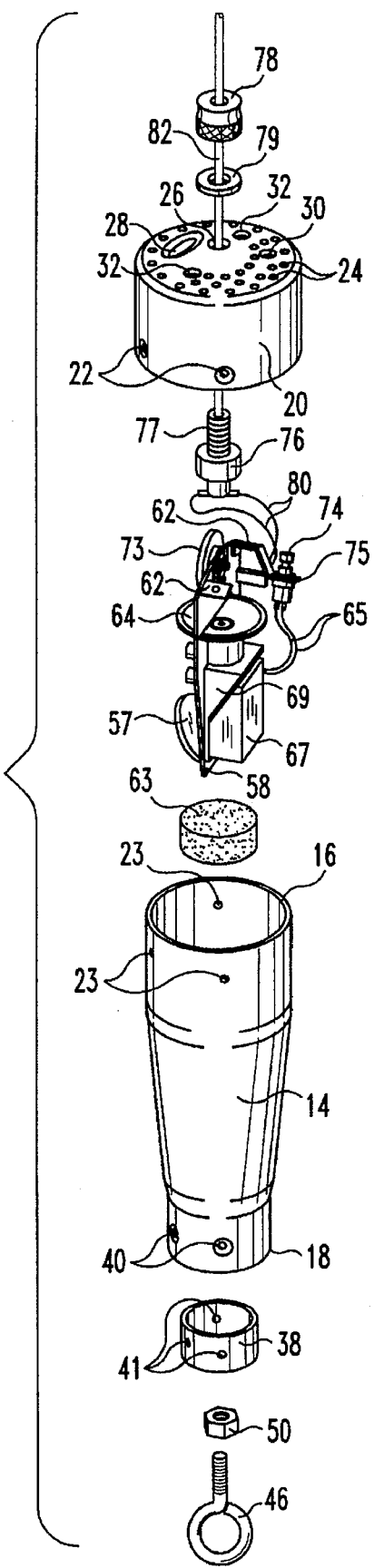
FIG. 2 is an enlarged, partial exploded perspective view of an exercise and amusement device for animals representing the present invention, depicted without the base.
Figure 4:
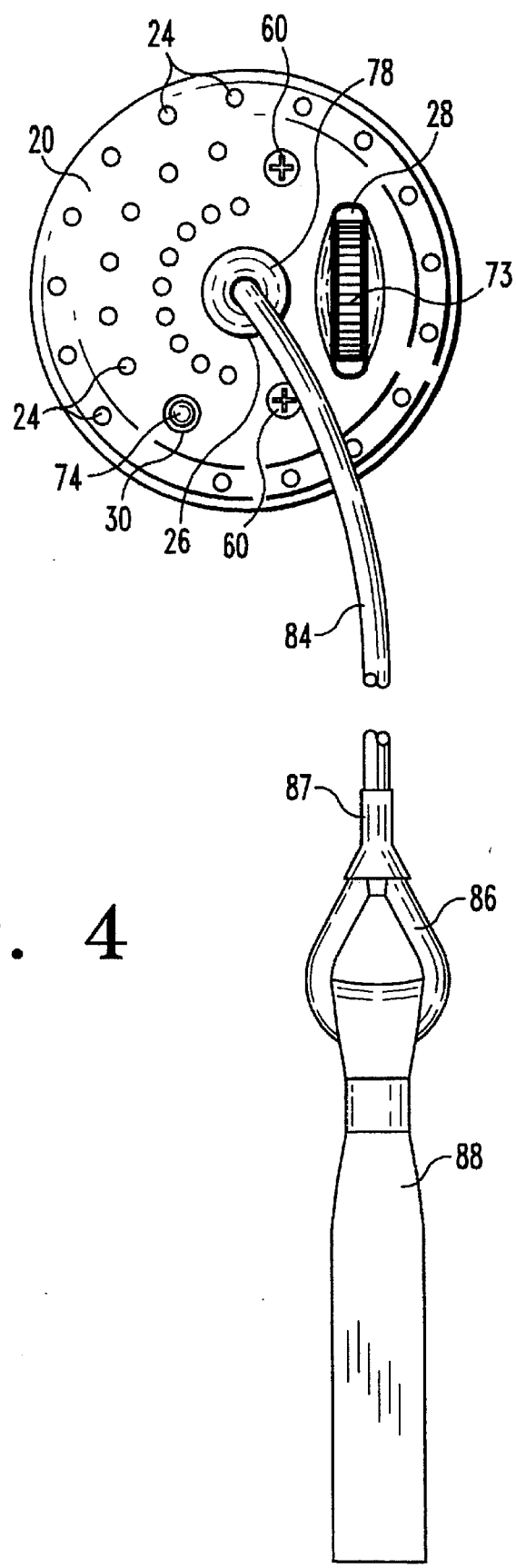
FIG. 4 is an enlarged top plan view of an exercise and amusement device for animals representing the present invention, shown separate from the base.

Referring now to the drawings for a detailed description of the present invention, reference is first made to FIGS. 1, 2, and 4, generally depicting an exercise and amusement device for animals of the present invention, showing generally cylindrical tapered housing 14 having larger first end 16 and smaller second end 18. Cap 20 is mounted partially surrounding housing 14 at first end 16 using a plurality of threaded cap fasteners 21 each disposed through one of a plurality of countersunk cap bores 22 defined in cap 20 and threadably engaged within one of a plurality of tapped cap fastener holes 23 defined in first end 16. Cap 20 defines a plurality of sound transmission holes 24, and also defines on/off switch bore 26, volume control opening 28, record switch hole 30, and a pair of support mounting bores 32. Cover 38 is mounted to housing 14 partially within second end 18 using a plurality of threaded cover fasteners 39 each disposed through one of a plurality of countersunk cover bores 40 defined in second end 18 and threadably engaged within one of a plurality of tapped cover fastener holes 41 defined in cover 38. Cover 38 also defines a tapped mounting bolt hole, not shown, and a mounting eye bolt 46, having threadably engaged nut 50, is removably attached to cover 38 at the mounting bolt hole. Housing 14, cap 20 and cover 38 may be formed of a durable, sturdy, resilient material, such as PVC plastic.

Figure 3:
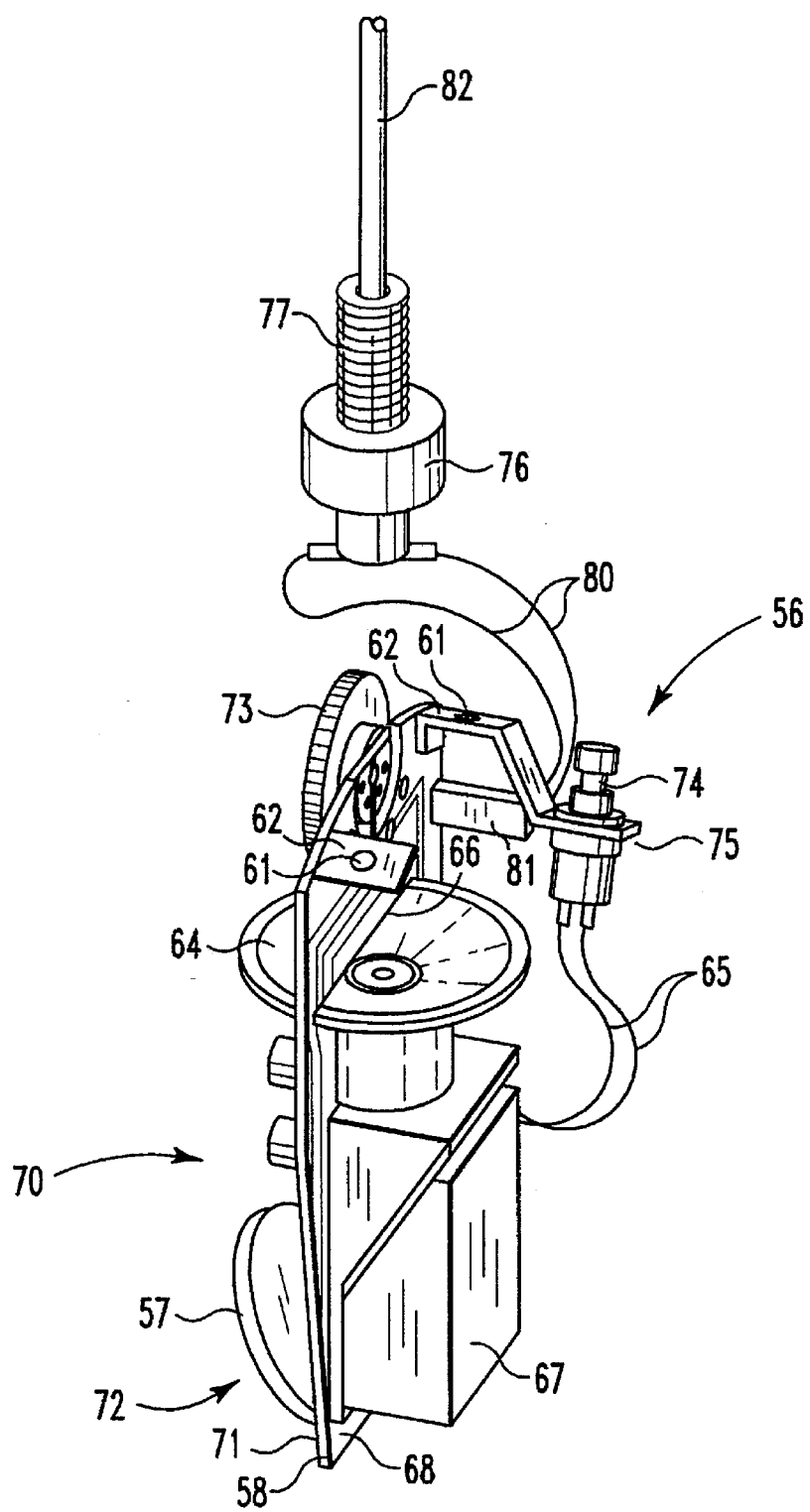
FIG. 3 is an enlarged, partial perspective view of an exercise and amusement device for animals representing the audio unit, on/off switch, and cable of the present invention.

As generally indicated in FIGS. 2–3, audio unit 56, capable of storing and playing a series of sounds as will be described, is disposed within housing 14, and includes support 58 mounted to cap 20 by a pair of threaded support fasteners 60, each disposed through one of support mounting bores 32 and threadably engaged within a tapped support fastener hole 61 defined in each of a pair of arms 62 attached to support 58. Generally cylindrical pad 63 is disposed within housing 14 proximate to second end 18 and provides cushioned support for audio unit 56 with respect to the interior of housing 14. Audio unit 56 further includes audio speaker 64 mounted to and partially disposed through support 58 at speaker slot 66 defined by support 58, power supply 67, and copper etched, printed circuit board 70. Power supply 67, for example a 9-volt dry cell battery, is mountable to support 58 at first surface 68 by snapping power supply 67 into power supply bracket 69 integrally formed with support 58, and circuit board 70 is mounted to support 58 at opposing second surface 71. Connected to circuit board 70 is microprocessor sound recorder module 72 having a non-volatile memory capable of storing a series of sounds. Audio unit 56 also includes piezoelectric audio microphone 57 connected to sound recorder module 72. The volume of sound playback may be varied by volume control 73 mounted to support 58 and disposed through volume control opening 28, and electrically connected to circuit board 70. Record switch 74 is mounted to support 58 at record switch bracket 75 attached to one of arms 62 and disposed partially through record switch hole 30, and is electrically connected to circuit board 70 by record switch wires 65. Tension-activated on/off switch 76 having threaded neck 77 is disposed within housing 14 proximate to first end 16 so that neck 77 projects through on/off switch bore 26, and is mounted to cap 20 by knurled switch nut 78 and switch washer 79. Cable 82 is attached to on/off switch 76 whereby a pulling action exerted on cable 82 acts to activate on/off switch 76. On/off switch 76 is electrically connected to circuit board 70 by on/off switch wires 80 attached to quick-release electrical connector 81. Flexible, resilient sheath 84 is disposed surrounding cable 82. As depicted in FIGS. 1 and 4, distal to housing 14, cable 82 and sheath 84 are disposed to form loop 86 secured by surrounding collar portion 87. Loosely disposed through loop 86 is flexible, resilient looped graspable member 88, adapted to be grasped in the mouth of an animal. Graspable member 88 may be selected to be any of a variety of lengths, with a length of approximately two feet found to be advantageous, and may be replaced as needed due to wear and tear. In addition, a favorite toy of an animal, such as a bone, sock, or similar, may be removably attached to the present invention by tying to graspable member 88, for grasping by the animal.

As shown in FIG. 1, housing 14 may be mounted to a relatively heavy base 90, such as a water or sand filled outdoor umbrella stand. Base 90 defines base upper bore 91, base lower bore 92, and has interior shoulder 93 disposed between base upper bore 91 and base lower bore 92, shoulder 93 defining a shoulder hole, not shown, connecting base upper bore 91 and base lower bore 92. After removing mounting eye bolt 46 and nut 50 from the tapped mounting bolt hole, housing 14 is inserted into base upper bore 91, and attached to base 90 by inserting mounting eye bolt 46 and nut 50 into base lower bore 92, through the shoulder hole and threadably engaging the tapped mounting bolt hole, with nut 50 bearing against shoulder 93.

Figure 5:
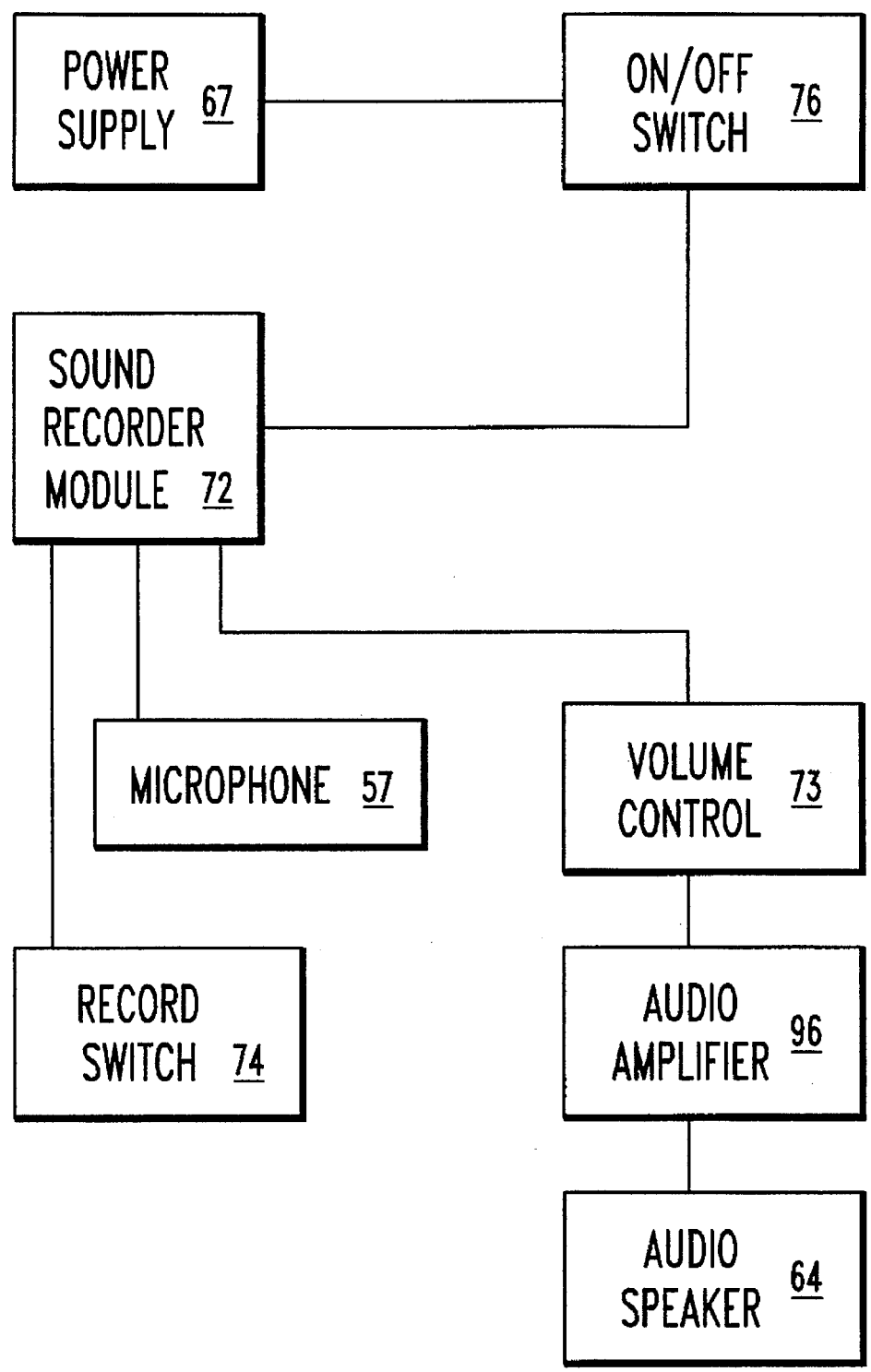
FIG. 5 is a block diagram of an exercise and amusement device for animals representing the present invention.

Referring to FIG. 5, in use, activation of on/off switch 76 by pulling on cable 82 causes power from power supply 67 to be delivered to circuit board 70, whereby sound recorder module 72 is activated. Microprocessor sound recorder module 72, such as is presently available from Information Storage Devices, includes means for storing a series of sounds in the memory, means for directing a series of sounds stored in the memory to speaker 64 whereby the series of sounds is played, and means for replacing the series of sounds stored in the memory with a new, second series of sounds including means for deleting a series of sounds from the memory, means for receiving a new series of sounds from microphone 57, and means for adding a new series of sounds received through microphone 57 to the memory. In the event that a series of sounds has been stored in the memory of sound recorder module 72, a pulling force exerted on cable 82 causes on/off switch 76 to activate audio unit 56, whereby the series of stored sounds present in the memory is directed to integrated circuit audio amplifier 96 mounted to circuit board 70 and thereafter to speaker 64, with volume control 73 adjusted to set the desired loudness of playback of the series of sounds. In this way, an animal pulling at graspable member 88 may cause a series of sounds to be played by the present invention. One series of sounds that may be present within the memory is that of the voice of a person familiar to the animal, so that playing of such series of sounds stimulates the animal to again pull at graspable member 88. In the event that a series of sounds is not stored in the memory of sound recorder module 72, or in the event that it is desired to replace a series of sounds presently stored with the memory with a new series of sounds, a new series of sounds may be stored in memory by simultaneously activating record switch 74 and causing the desired new series of sounds to be announced near sound transmission holes 24, whereby microphone 57 receives the new series of sounds. The announced new series of sounds are directed to sound recorder module 72, converted and stored in the memory, ready for playback as previously described in response to activation of on/off switch 76.

In a second embodiment, housing 14 may be utilized without base 90, by removable attachment to a stationary object, not shown, such as a door, post, tree or similar, looping a connecting rope or similar, not shown, through mounting eye bolt 46 and attaching the rope to the stationary object. In order to protect housing 14 when attached to a stationary object, a flexible, protective covering boot, not shown, may be disposed around housing 14.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An exercise and amusement device for animals comprising:

a housing having a first end and a second end;

an audio unit capable of storing and playing a series of sounds, said audio unit disposed within said housing;

a tension-activated switch connected to said audio unit so that activation of said switch causes the stored series of sounds to be played;

a member adapted to be grasped by the mouth of an animal;

a cable attached between said member and said switch;

a base having an upper surface and defining a bore disposed proximate to said upper surface; and means for removably attaching said housing to said base so that said second end is disposed within said bore, at least a portion of said housing is surrounded by said base, and said housing is supported against movement when said member is pulled.

2. An exercise and amusement device for animals as defined in claim 1, wherein said audio unit includes means for replacing the stored series of sounds with a second series of sounds.

3. An exercise and amusement device for animals as defined in claim 2, wherein said means for replacing the stored series of sounds includes a record switch for activating said audio unit to replace the stored series of sounds with a second series of sounds, said record switch disposed partially through a record switch hole defined by said housing.

4. An exercise and amusement device for animals as defined in claim 1, wherein said audio unit includes means for varying the volume at which the stored series of sounds is played.

5. An exercise and amusement device for animals as defined in claim 1, wherein said audio unit includes:

means for varying the volume at which the stored series of sounds is played; and means for replacing the stored series of sounds with a second series of sounds.

6. An exercise and amusement device for animals as defined in claim 1, wherein said base further includes an interior shoulder disposed within said bore, and said means for removably attaching said housing to said base includes a fastener for removably attaching said second end to said shoulder.

7. An exercise and amusement device for animals, for attachment to a stationary support, comprising:

a housing;

means for removably attaching said housing to the stationary support including an elongated connector for attachment between said housing and the stationary support, whereby said housing may be connected to and disposed remote from the stationary support;

an audio unit capable of storing and playing a series of sounds, said audio unit disposed within said housing;

a tension-activated switch connected to said audio unit so that activation of said switch causes the stored series of sounds to be played;

a member adapted to be grasped by the mouth of an animal; and a cable attached between said member and said switch.

8. An exercise and amusement device for animals as defined in claim 7, wherein said audio unit includes means for replacing the stored series of sounds with a second series of sounds.

9. An exercise and amusement device for animals as defined in claim 8, wherein said means for replacing the stored series of sounds includes a record switch for activating said audio unit to replace the stored series of sounds with a second series of sounds, said record switch disposed partially through a record switch hole defined by said housing.

10. An exercise and amusement device for animals as defined in claim 7, wherein said audio unit includes means for varying the volume at which the stored series of sounds is played.

11. An exercise and amusement device for animals as defined in claim 7, wherein said audio unit includes:

means for varying the volume at which the stored series of sound is played; and means for replacing the stored series of sounds with a second series of sounds.

12. An exercise and amusement device for animals as defined in claim 11, further comprising a flexible, resilient housing cover disposed surrounding said housing.

13. An exercise and amusement device for animals comprising:

a housing having a first end and a second end;

an audio unit capable of storing and playing a series of sounds, said audio unit disposed within said housing and including an audio speaker, and a microprocessor means having a non-volatile memory, means for storing a series of sounds in said memory, and means for directing a series of sounds stored in said memory to said audio speaker whereby the series of sounds is played;

a tension-activated switch connected to said audio unit so that activation of said switch causes the storm series of sounds to be played;

a member adapted to be grasped by the mouth of an animal;

an elastic cable attached between said member and said switch;

a base having an upper surface and defining a bore disposed proximate to said upper surface; and means for removably attaching said housing to said base so that said second end is disposed within said bore, at least a portion of said housing is surrounded by said base, and said housing is supported against movement when said member is pulled.

14. An exercise and amusement device for animals as defined in claim 13, wherein said audio unit further includes means for varying the volume at which the stored series of sounds is played.

15. An exercise and amusement device for animals as defined in claim 14, wherein said audio unit further includes audio microphone means, and said microprocessor means further includes means for deleting the stored series of sounds from said memory, means for receiving a second series of sounds from said audio microphone means and means for adding the second series of sounds to said memory.

16. An exercise and amusement device for animals as defined in claim 15, wherein said audio microphone means comprises a piezoelectric microphone.

17. An exercise and amusement device for animals as defined in claim 16, wherein said base further includes an interior shoulder disposed within said bore, and said means for removably attaching said housing to said base includes a fastener for removably attaching said second end to said shoulder.

18. An exercise and amusement device for animals as defined in claim 13 wherein said tension-activated switch is capable of being disposed in an unactivated state and an activated state, whereby tension exerted upon said tension-activated switch causes said tension-activated switch to change from the unactivated state to the activated state so that the stored series of sounds is played.

\* \* \* \* \*